United States Patent
Herlihy

(10) Patent No.: US 10,471,784 B1
(45) Date of Patent: Nov. 12, 2019

(54) TRAILER HITCH WITH SAFETY ARM

(71) Applicant: Joseph F. Herlihy, Eland, WI (US)

(72) Inventor: Joseph F. Herlihy, Eland, WI (US)

( * ) Notice: Subject to any disclaimer, the term of this patent is extended or adjusted under 35 U.S.C. 154(b) by 110 days.

(21) Appl. No.: 15/879,336

(22) Filed: Jan. 24, 2018

Related U.S. Application Data

(60) Provisional application No. 62/450,225, filed on Jan. 25, 2017.

(51) Int. Cl.
*B60D 1/00* (2006.01)
*B60D 1/28* (2006.01)
*B60D 1/06* (2006.01)

(52) U.S. Cl.
CPC ........ *B60D 1/28* (2013.01); *B60D 1/06* (2013.01)

(58) Field of Classification Search
CPC .................................................. B60D 1/28
USPC ............................... 280/507, 512, 513, 514
See application file for complete search history.

(56) References Cited

U.S. PATENT DOCUMENTS

| | | | | |
|---|---|---|---|---|
| 6,802,523 B1 * | 10/2004 | Profitt | ................... | B60D 1/025 280/432 |
| 6,932,376 B1 * | 8/2005 | Profitt | ................... | B60D 1/065 280/432 |
| 7,264,261 B2 * | 9/2007 | Konsela | ................... | B60D 1/02 280/416.1 |
| 8,226,107 B2 * | 7/2012 | Columbia | ................ | B60D 1/06 280/495 |
| 9,333,821 B1 * | 5/2016 | Rosario | ................... | B60D 1/28 |
| 2003/0057678 A1 * | 3/2003 | Barton | ................... | B60D 1/065 280/507 |
| 2004/0201201 A1 * | 10/2004 | Causey, Jr. | ............ | B60D 1/065 280/511 |
| 2006/0186639 A1 * | 8/2006 | Rosario | ................... | B60D 1/065 280/507 |
| 2012/0032416 A1 * | 2/2012 | Frantz | ...................... | B60D 1/06 280/477 |
| 2017/0087947 A1 * | 3/2017 | Moore | ................... | B60D 1/583 |
| 2018/0304707 A1 * | 10/2018 | Jennex | ..................... | B60D 1/06 |

OTHER PUBLICATIONS

B&W Tow & Stow Pintle Hitch, website printout, dated Jan. 10, 2017, www.turnoverball.com.
Gen-Y Hitch GH-424 hitch, website printout, dated Jan. 10, 2017, genyhitch.com.
Realtruck Curt Pintle Hook, website printout, dated Jan. 10, 2017, www.realtruck.com.

\* cited by examiner

*Primary Examiner* — Tony H Winner
(74) *Attorney, Agent, or Firm* — Donald J. Ersler

(57) ABSTRACT

A trailer hitch with safety arm preferably includes a ball mount member, a hitch insert projection and a safety arm. The ball mount member preferably includes a ball leg and an insert leg. The ball leg extends forward and substantially horizontal from a bottom of the insert leg. A hitch ball hole is formed through the ball leg to receive a hitch ball. The hitch insert projection extends rearward and substantially horizontal from the insert leg. The hitch insert projection is preferably a square tube that has an outer perimeter, which is sized to be received by a female hitch receiver. A safety yoke is formed on an upper and front portion of the insert leg. The safety arm is retained in the yoke with a removable fastener and a quick release pin device. The safety arm pivots relative to the insert leg with the removable fastener.

12 Claims, 5 Drawing Sheets

TRAILER HITCH WITH SAFETY ARM

CROSS-REFERENCES TO RELATED APPLICATIONS

This is a utility patent application, which claims the benefit of provisional application No. 62/450,225 filed on Jan. 25, 2017.

BACKGROUND OF THE INVENTION

Field of the Invention

The present invention relates generally to trailers and more specifically to a trailer hitch with safety arm, which prevents a trailer hitch coupler from completely separating from a hitch ball.

Discussion of the Prior Art

It appears that the prior art does not teach or suggest a trailer hitch with safety arm, which presents a trailer hitch coupler from detaching from a hitch ball. Pintle hitches disclose a necessary safety latch, which retains a trailer arm loop in the trailer hitch. However, ball based trailer hitch couplers include a locking latch, which usually prevents the trailer arm from detaching from a hitch ball. Normally, chains are used as a safety measure for preventing trailer hitch coupler from detaching from the pulling vehicle. However, this will not prevent a trailer hitch coupler from detaching from a hitch ball.

Accordingly, there is a clearly felt need in the art for a trailer hitch with safety arm, which prevents a trailer hitch coupler from completely separating from a hitch ball.

SUMMARY OF THE INVENTION

The present invention provides a trailer coupler with safety arm, which prevents a trailer hitch coupler from completely separating from a hitch ball. The trailer hitch with safety arm preferably includes a ball mount member, a hitch insert projection and a safety arm. The ball mount member preferably includes a ball leg and an insert leg. The ball leg extends forward and substantially horizontal from a bottom of the insert leg. A hitch ball hole is formed through the ball leg to receive a threaded rod of a hitch ball. The hitch insert projection extends rearward and substantially horizontal from the insert leg. The hitch insert projection is preferably a square tube that has an outer perimeter, which is sized to be received by a female hitch receiver. A safety yoke preferably extends from an upper and front portion of the insert leg. The safety arm is retained in the safety yoke with a removable fastener and a quick release pin device. The safety arm pivots on the removable fastener and relative to the insert leg, when the quick release pin device is removed. In use, the hitch insert projection is inserted into the female hitch receiver and secured therein. A hitch ball is secured in the hitch ball hole. The safety arm is swung into a Removal position. A trailer hitch coupler is secured to the hitch ball. The safety arm is swung into a lock position. The quick release pin device is inserted through holes in the safety yoke and the safety arm and secured in place. If the trailer hitch coupler unlocks from the hitch ball, the safety arm will keep the ball hitch inserted in the hitch arm coupler.

Accordingly, it is an object of the present invention to provide a trailer hitch with safety arm, which prevents a trailer hitch coupler from completely separating from a hitch ball.

These and additional objects, advantages, features and benefits of the present invention will become apparent from the following specification.

DETAILED DESCRIPTION OF THE PREFERRED EMBODIMENTS

Figure 1:
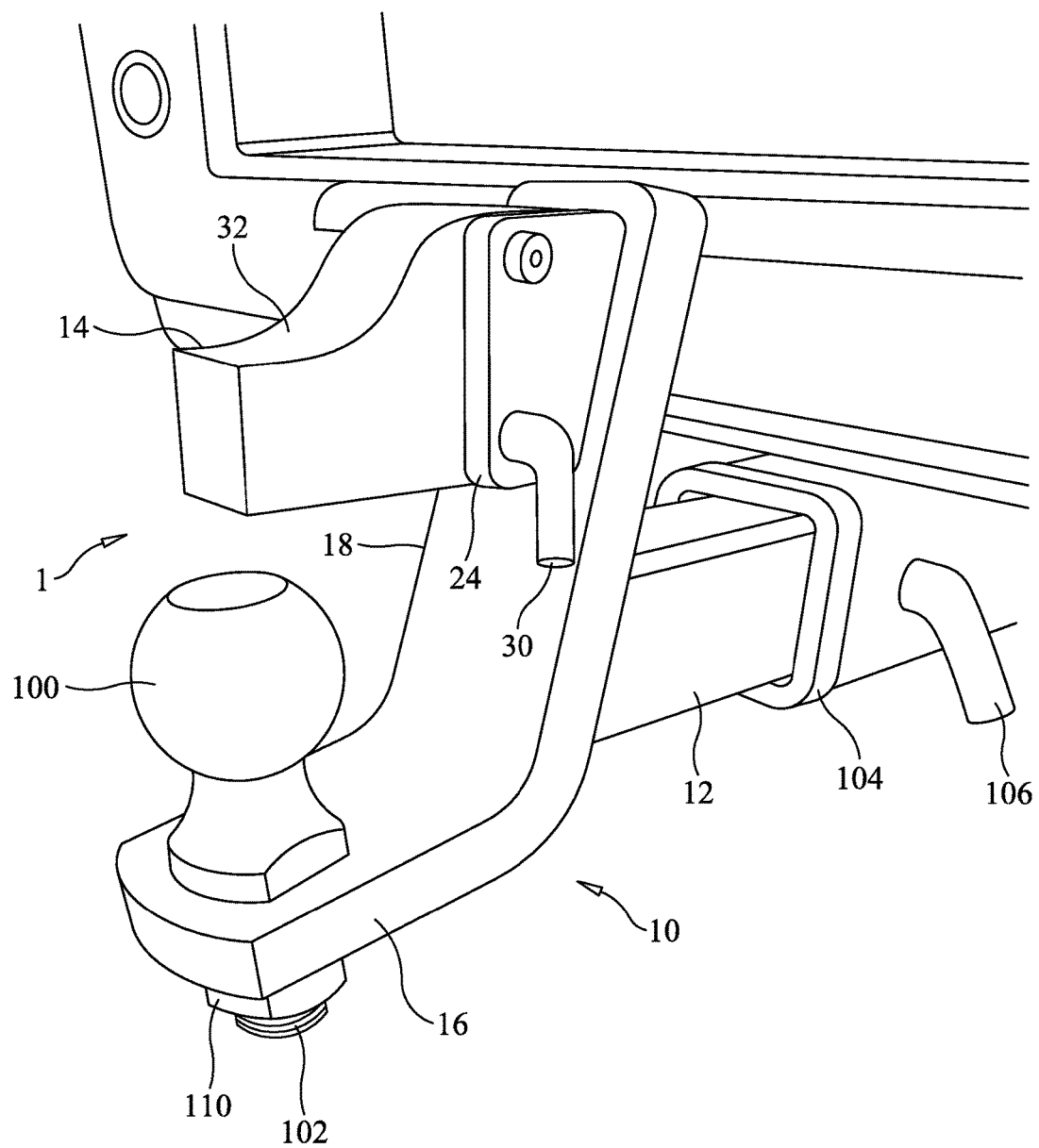
FIG. 1 is a right side perspective view of a trailer hitch with safety arm secured in a female hitch receiver in accordance with the present invention.
Figure 2:
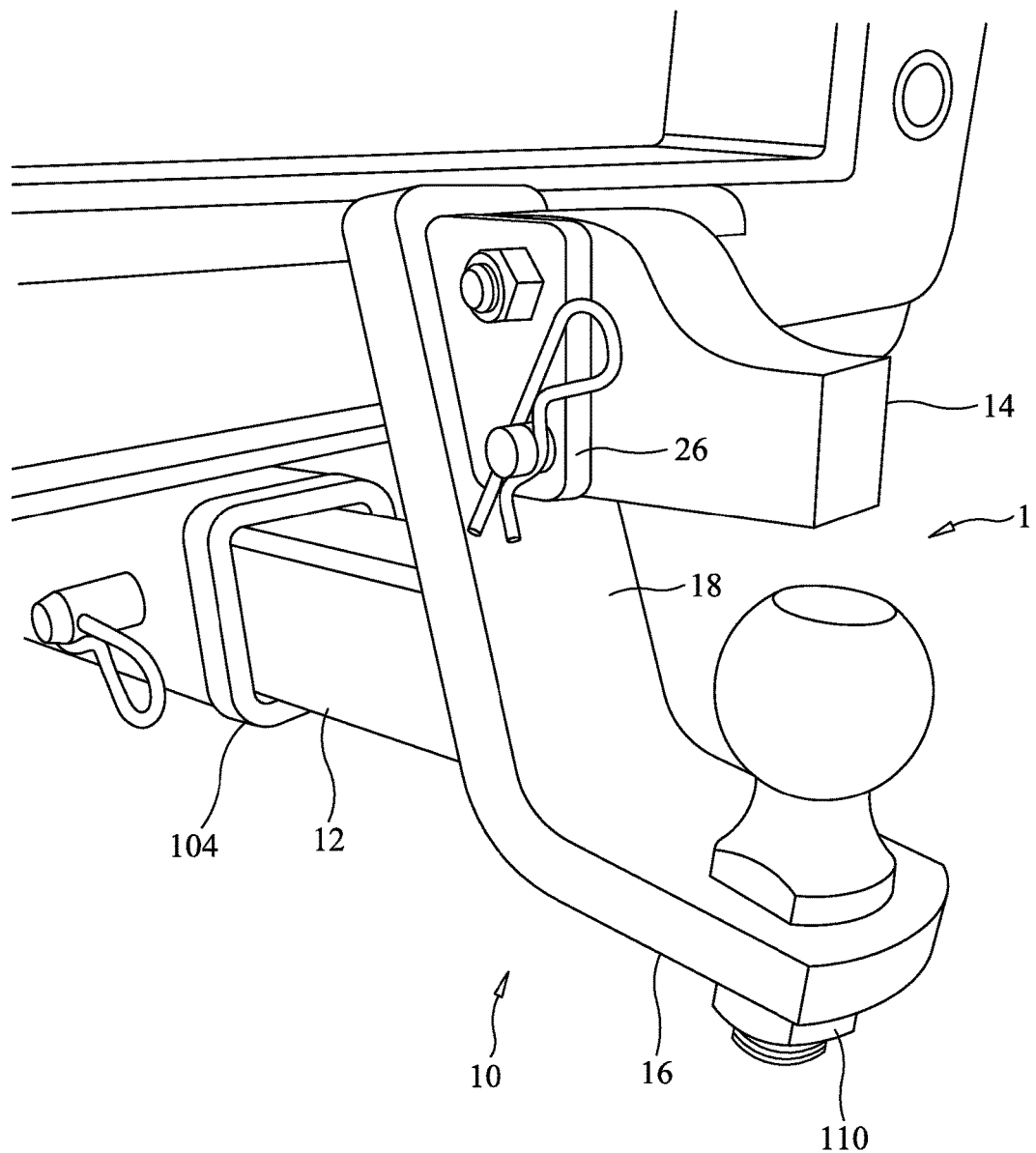
FIG. 2 is a left side perspective view of a trailer hitch with safety arm secured in a female hitch receiver in accordance with the present invention.
Figure 3:
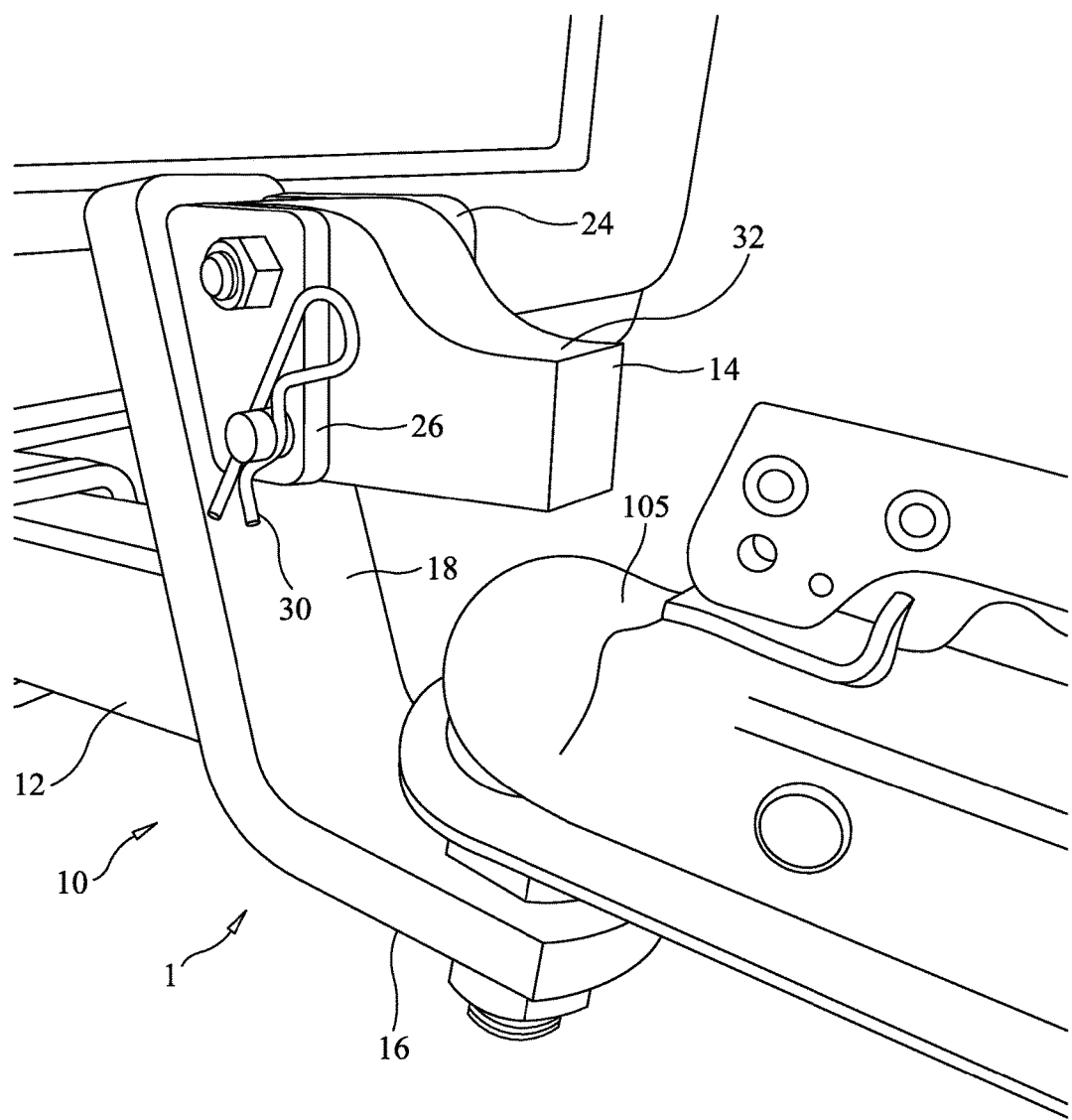
FIG. 3 is a left side perspective view of a trailer hitch coupler attached to a trailer hitch with safety arm with the safety arm in a locked position in accordance with the present invention.
Figure 4:
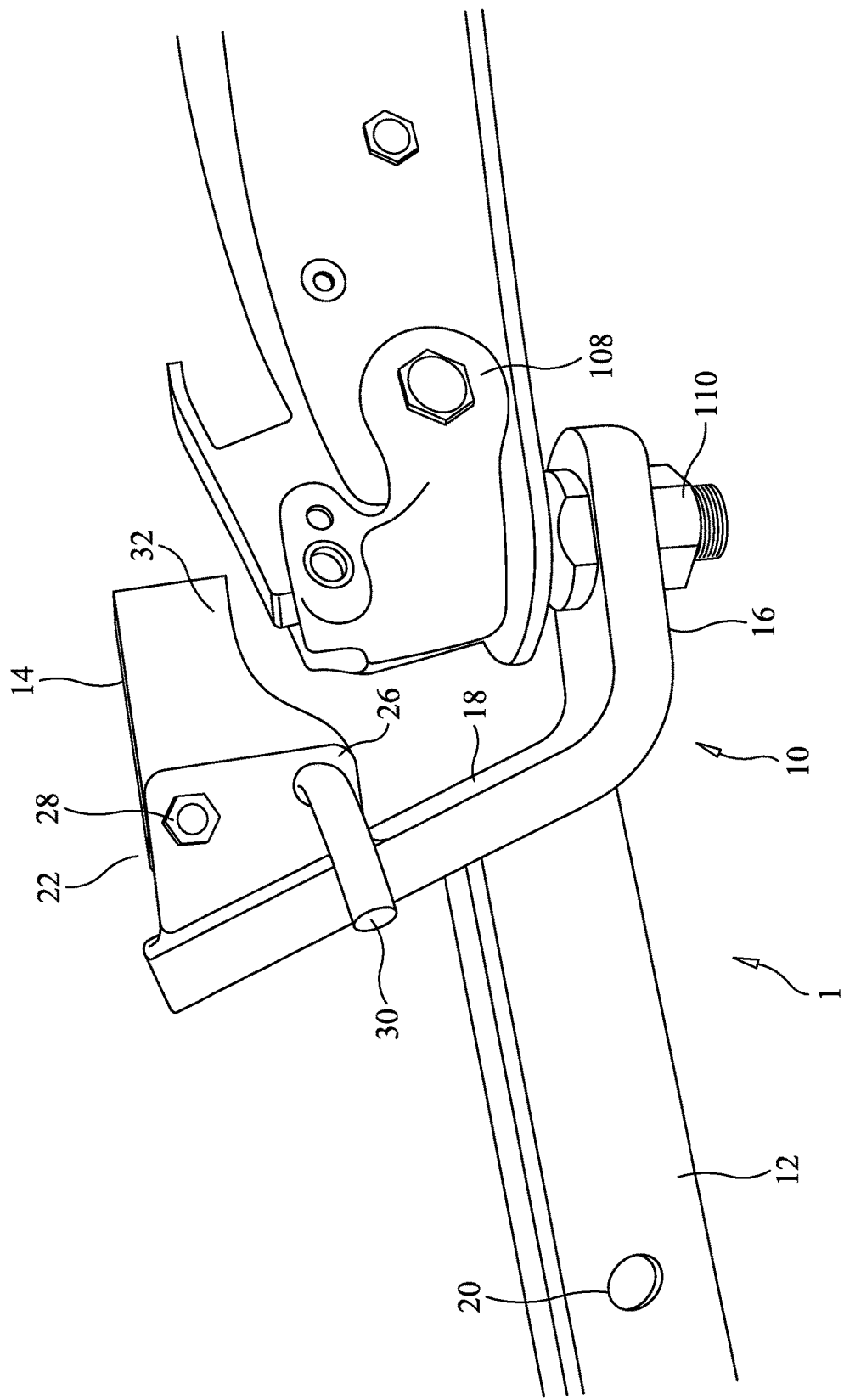
FIG. 4 is a side view of a second style of trailer hitch coupler attached to a trailer hitch with safety arm with the safety arm in a locked orientation in accordance with the present invention.

With reference now to the drawings, and particularly to FIG. 1, there is shown a right side perspective view of a trailer hitch with safety arm 1. With reference to FIGS. 2-4, the trailer hitch with safety arm 1 preferably includes a ball mount member 10, a hitch insert projection 12 and a safety arm 14. The ball mount member 10 preferably includes a ball leg 16 and an insert leg 18. The ball leg 16 extends forward and substantially horizontal from a bottom of the insert leg 18. The ball mount member 10 is preferably fabricated from a single piece of material. A hitch ball hole is formed through the ball leg to receive a threaded rod 102 of a hitch ball 100. The hitch insert projection 12 extends rearward and substantially horizontal from the insert leg 18. The hitch insert projection 12 is preferably a square tube that has an outer perimeter, which is sized to be received by a female hitch receiver 104. A trailer hitch coupler 105 is attached to the hitch ball 100. A receiver retention hole 20 is formed through the hitch insert projection 12 to receive a retention pin 106 of the female hitch receiver 104.

Figure 5:
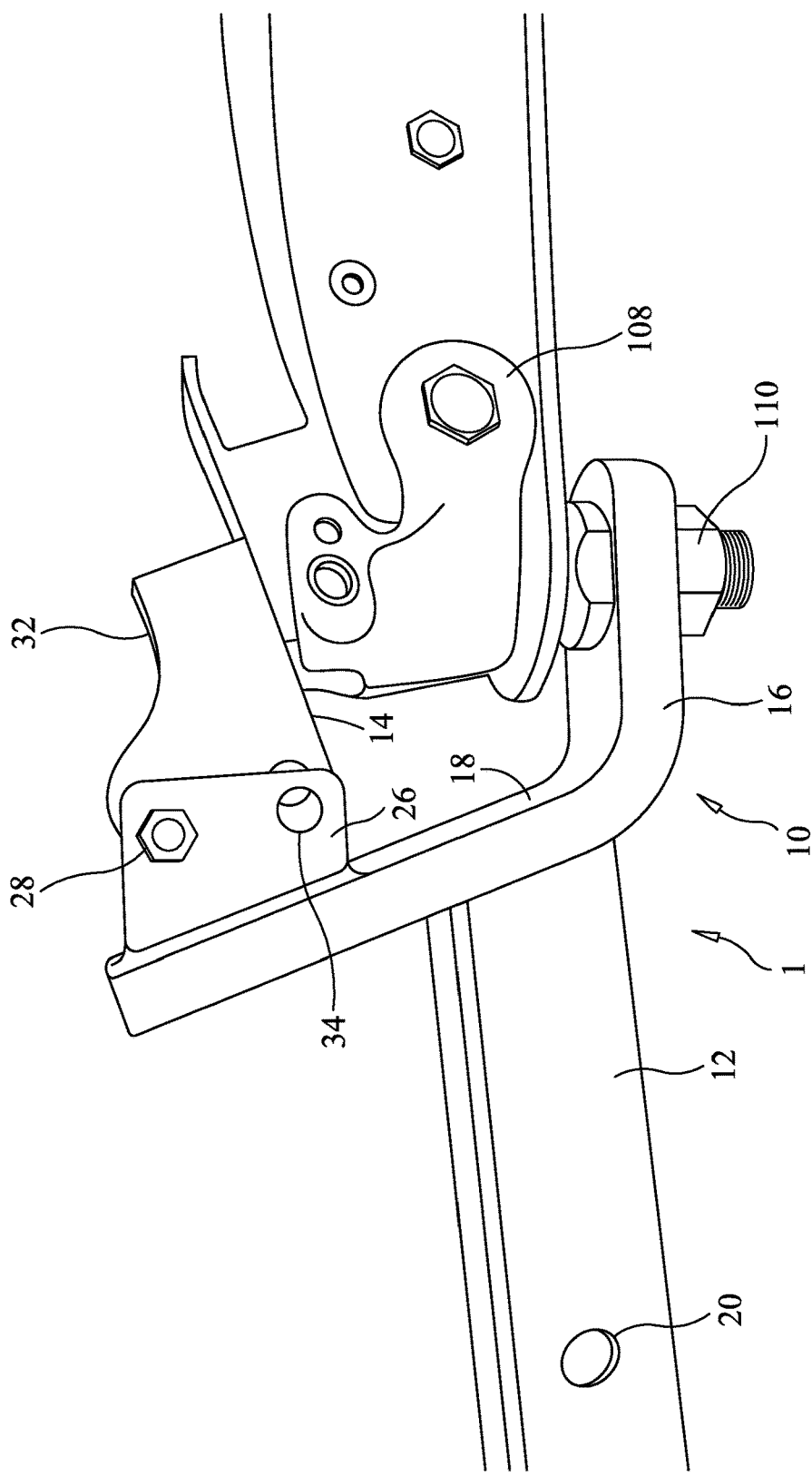
FIG. 5 is a side view of a second style of trailer hitch coupler attached to a trailer hitch with safety arm with the quick release pin device 30 is removed in accordance with the present invention.

A safety yoke 22 is preferably formed on an upper and front portion of the insert leg 18. The safety yoke 22 includes a first ear 24 and a second ear 26. The safety arm 14 is retained between the first and second ears 24, 26 with a removable fastener or removable pin 28 and a quick release pin device 30. With reference to FIG. 5, the safety arm 14 pivots on the removable fastener or removable pint 28 and relative to the insert leg 18, when the quick release pin device 30 is removed. The safety arm 14 includes a contoured surface 32, which allows a second style of trailer hitch coupler 108 to be retained on the hitch ball 100. The second style of trailer hitch coupler 108 includes a greater height. With reference to FIG. 4, the safety arm 14 is flipped-over relative to FIG. 3 to accommodate the trailer hitch coupler 108.

In use, the hitch insert projection 12 is inserted into the female hitch receiver 104 and secured therein with the retention pin 106. The treaded rod 102 of the hitch ball 100 is inserted into the hitch ball hole and secured in the hitch ball hole with a hitch nut 110. The quick release pin device 30 is removed from the safety yoke 22 and the safety arm 14 is swung into a removal position. The trailer hitch coupler 105, 108 is secured to the hitch ball 100. The safety arm 14 is swung into a lock position. The quick release pin device 30 is inserted through holes 34 in the safety yoke 22 and the safety arm 14 and secured in place. If the trailer hitch coupler 105, 108 unlocks from the hitch ball 100, the safety arm 14 will keep the ball hitch 100 inserted in the trailer hitch coupler.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A trailer hitch with safety arm comprising:
a ball mount member includes a ball leg and an insert leg, said ball leg extends from one side of the insert leg, said ball leg includes a hitch ball hole, wherein said hitch ball hole is capable of retaining a hitch ball;
a hitch insert projection extends from an opposing side of said insert leg;
a removable pin;
a safety arm extends from said one side of said insert leg above said ball leg, said safety arm is pivotally retained on said insert leg, wherein said safety arm includes a lock position and a removal position, said hitch arm extends above the hitch ball, said removable pin is engaged with said safety arm and said insert leg in said lock position, said removable pin is not engaged with said safety arm in a removal position.

2. The trailer hitch with safety arm of claim 1 wherein:
said safety arm includes a contoured surface for receiving trailer hitch couplers with different heights.

3. The trailer hitch with safety arm of claim 1 wherein:
said hitch insert projection is a square tube.

4. The trailer hitch with safety arm of claim 1 wherein:
a receiver retention hole is formed through said hitch insert projection, said receiver retention hole is capable of receiving a retention pin of a female hitch receiver.

5. A trailer hitch with safety arm comprising:
a ball mount member includes a ball leg and an insert leg, said ball leg extends from one side of the insert leg, said ball leg includes a hitch ball hole, wherein said hitch ball hole is capable of retaining a hitch ball;
a hitch insert projection extends from an opposing side of said insert leg;
a safety yoke extends from said one side of said insert leg, said safety yoke includes a first ear and a second ear;
a removable pin;
a safety arm is pivotally retained between said first and second ears, wherein said safety arm includes a lock position and a removal position, said hitch arm extends above the hitch ball, said removable pin is engaged with said safety arm and said safety yoke in said lock position, said removable pin is not engaged with said safety arm in a removal position.

6. The trailer hitch with safety arm of claim 5 wherein:
said safety arm includes a contoured surface for receiving trailer hitch couplers with different heights.

7. The trailer hitch with safety arm of claim 5 wherein:
said hitch insert projection is a square tube.

8. The trailer hitch with safety arm of claim 5 wherein:
a receiver retention hole is formed through said hitch insert projection, said receiver retention hole is capable of receiving a retention pin of a female hitch receiver.

9. A trailer hitch with safety arm comprising:
a ball mount member includes a ball leg and an insert leg, said ball leg extends from one side of the insert leg, said ball leg includes a hitch ball hole, wherein said hitch ball hole is capable of retaining a hitch ball;
a hitch insert projection extends from an opposing side of said insert leg, wherein said hitch insert projection is capable of being received by a female hitch receiver;
a safety yoke extends from said one side of said insert leg, said safety yoke includes a first ear and a second ear;
a removable pin;
a safety arm is pivotally retained between said first and second ears, wherein said safety arm includes a lock position and a removal position, said hitch arm extends above the hitch ball, said removable pin is engaged with said safety arm and said safety yoke in said lock position, said removable pin is not engaged with said safety arm in a removal position.

10. The trailer hitch with safety arm of claim 9 wherein:
said safety arm includes a contoured surface for receiving trailer hitch couplers with different heights.

11. The trailer hitch with safety arm of claim 9 wherein:
said hitch insert projection is a square tube.

12. The trailer hitch with safety arm of claim 9 wherein:
a receiver retention hole is formed through said hitch insert projection, said receiver retention hole is capable of receiving a retention pin of the female hitch receiver.

* * * * *